United States Patent
Bacon, Jr.

(10) Patent No.: US 7,842,374 B2
(45) Date of Patent: Nov. 30, 2010

(54) RETROREFLECTIVE ARTICLE COMPRISING A COPOLYESTER ETHER COMPOSITION LAYER AND METHOD OF MAKING SAME

(75) Inventor: Chester A. Bacon, Jr., Oakdale, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 726 days.

(21) Appl. No.: 11/460,749

(22) Filed: Jul. 28, 2006

(65) Prior Publication Data

US 2008/0026184 A1    Jan. 31, 2008

(51) Int. Cl.
*B32B 3/00* (2006.01)
*G02B 5/122* (2006.01)

(52) U.S. Cl. ............... 428/156; 428/172; 428/167; 359/529; 359/530

(58) Field of Classification Search .......... 428/156, 428/172, 167; 359/529, 530, 536, 540, 539
See application file for complete search history.

(56) References Cited

U.S. PATENT DOCUMENTS

| | | | |
|---|---|---|---|
| 4,025,159 A | | 5/1977 | McGrath |
| 4,096,126 A | * | 6/1978 | Tanaka et al. ............ 528/305 |
| 4,251,652 A | * | 2/1981 | Tanaka et al. ............ 528/279 |
| 4,377,998 A | | 3/1983 | Hartel et al. |
| 4,664,966 A | | 5/1987 | Bailey et al. |
| 4,983,436 A | | 1/1991 | Bailey et al. |
| 5,055,347 A | | 10/1991 | Bacon, Jr. |
| 5,064,272 A | | 11/1991 | Bailey et al. |
| 5,066,098 A | | 11/1991 | Kult et al. |
| 5,069,964 A | | 12/1991 | Tolliver et al. |
| 5,138,488 A | | 8/1992 | Szczech |
| 5,175,030 A | | 12/1992 | Lu et al. |
| 5,186,597 A | | 2/1993 | Bulsterbaum et al. |
| 5,262,225 A | | 11/1993 | Wilson et al. |
| 5,316,838 A | * | 5/1994 | Crandall et al. ............ 442/183 |
| 5,387,458 A | | 2/1995 | Pavelka et al. |
| 5,450,235 A | | 9/1995 | Smith et al. |
| 5,605,761 A | | 2/1997 | Burns et al. |
| 5,614,286 A | | 3/1997 | Bacon, Jr. et al. |
| 5,648,145 A | | 7/1997 | Martin |

(Continued)

FOREIGN PATENT DOCUMENTS

FR    2171986    9/1973

OTHER PUBLICATIONS

European Standard EN471, High-visibility warning clothing for professional use—Test methods and requirements, 30 pages, 2003.

(Continued)

*Primary Examiner*—Jennifer C McNeil
*Assistant Examiner*—Catherine Simone
(74) *Attorney, Agent, or Firm*—Nicole J. Einerson

(57) ABSTRACT

A retroreflective article that includes a first layer that includes a copolyester ether composition, and a second layer that includes a retroreflective structure juxtaposed in at least a partially overlying relationship to the first layer is disclosed. Also disclosed is a method of forming a retroreflective article that includes providing at least a copolyester ether composition layer, and providing a retroreflective structure in a juxtaposed and at least partially overlying relationship to the composition layer.

29 Claims, 6 Drawing Sheets

U.S. PATENT DOCUMENTS

| | | | |
|---|---|---|---|
| 5,691,846 A | 11/1997 | Benson, Jr. et al. | |
| 5,812,317 A | 9/1998 | Billingsley et al. | |
| 5,888,618 A | 3/1999 | Martin | |
| 6,024,455 A | 2/2000 | O'Neill et al. | |
| 6,096,247 A | 8/2000 | Ulsh et al. | |
| 6,157,486 A * | 12/2000 | Benson et al. | 359/498 |
| 6,352,761 B1 | 3/2002 | Hebrink et al. | |
| 6,531,214 B2 | 3/2003 | Carter et al. | |
| 6,592,967 B2 | 7/2003 | Kaufman | |
| 6,599,994 B2 | 7/2003 | Shelby et al. | |
| 6,677,028 B1 | 1/2004 | Lasch et al. | |
| 6,723,768 B2 | 4/2004 | Adams et al. | |
| 6,773,835 B2 | 8/2004 | Shoshi et al. | |
| 6,800,378 B2 | 10/2004 | Hawa et al. | |
| 6,818,293 B1 | 11/2004 | Keep et al. | |
| 7,059,936 B2 | 6/2006 | Prasad | |
| 2002/0071183 A1 | 6/2002 | Mullen et al. | |
| 2002/0094417 A1 | 7/2002 | Phillips | |
| 2002/0106486 A1 | 8/2002 | Nielsen et al. | |
| 2003/0035972 A1 | 2/2003 | Hanson et al. | |
| 2004/0234724 A1 | 11/2004 | Kaminsky et al. | |
| 2005/0249957 A1 | 11/2005 | Jing et al. | |

OTHER PUBLICATIONS

ECDEL Elastomers, Eastman Chemical Company,—<http://www.eastman.com/Brands/Ecdel/>—1 page, published prior to Jul. 28, 2005.

NEOSTAR@FN006, Eastman Chemical Company,—<http://www.eastman.com/Brands/NEOSTAR/Introduction/Introduction>—1 page, published prior to Jul. 28, 2005.

ASTM D882-02, "Standard Test Method for Tensile Properties of Thin Plastic Sheeting" pp. 167-176, Jun. 2002.

PCT Search Report, PCT/US2007/073196.

* cited by examiner

RETROREFLECTIVE ARTICLE COMPRISING A COPOLYESTER ETHER COMPOSITION LAYER AND METHOD OF MAKING SAME

The present disclosure relates to retroreflective articles and methods of making the same. More particularly, the present disclosure relates to retroreflective articles comprising a copolyester ether composition layer and method of making the same.

BACKGROUND

Retroreflective articles have the ability to redirect obliquely incident light back towards the light source. This unique ability has led to the wide-spread use of retroreflective articles on various substrates. For example, retroreflective articles can be used on flat, inflexible substrates, such as road signs and barricades; on irregular surfaces, such as corrugated metal truck trailers, license plates, and traffic barriers; and on flexible substrates, such as road worker safety vests, a jogger's shoes, roll up signs, and canvas-sided trucks. Retroreflective articles are also employed for various other safety as well as decorative purposes. Retroreflective articles are particularly useful in low-light conditions to improve safety by retroreflecting light incident thereon to the source of the incident light.

Retroreflective articles are typically used on clothing to increase the visibility of the individual by retroreflecting the incident light. The retroreflective articles that are utilized on clothing include strips of tape that are adhered to clothing with heat sensitive adhesive, patches permanently affixed or sewn to the clothing, and articles of clothing that include a retroreflective article within the clothing. Retroreflective clothing is especially useful to construction workers and exercisers who utilize roadways because these individuals are in close proximity to moving vehicles on a regular basis and the retroreflective articles make the individuals more visible to drivers under low light conditions.

Retroreflective articles typically utilize a highly plasticized polyvinyl chloride (PVC) film as an overlying sheet for passing light to a retroreflective structure that includes, for example, cube-corner reflecting elements. However, plasticizers have a tendency to migrate from PVC film. Accordingly, over time plasticized PVC films lose temperature stability and flexibility (especially in cold weather). Also, plasticizers are used to enhance flexibility of polyvinyl chloride (PVC) films. However, plasticizers make PVC films exhibit relatively low softening temperatures (e.g., 180° F.). Such low softening temperatures tend to place constraints on commercial manufacture of retroreflective articles including plasticized PVC film since the latter do not possess sufficient rigidity for efficient web transportation through the manufacturing process. For example, cube-corner reflecting elements when cast or joined to the plasticized PVC film are typically cured at temperatures higher than the softening temperatures of the PVC film. To compensate for this softening, additional polyester layers, such as a top sheet and a releasable backing sheet that do not soften at cube-corner curing temperatures are typically joined to the plasticized PVC films. While enabling efficient web transportation, these additional layers add to overall manufacturing costs and are ultimately discarded. Furthermore, annealing plasticized PVC films following curing of cast cube-corners is required to overcome detrimental affects induced by softening. Annealing, however, adds to overall manufacturing energy costs. Some plasticizers, such as di octyl phthalate (DOP) are reported to have health risks to young children. Other long-term durability issues are also created when using plasticized PVC film.

SUMMARY

In one aspect, the present disclosure includes a retroreflective article comprising a first layer comprised of a copolyester ether composition, and a second layer comprised of a retroreflective structure juxtaposed and at least partially overlying to at least a portion of the first layer.

In another aspect, the present disclosure includes a retroreflective article comprising a first layer comprised of a copolyester ether composition, and a second layer comprised of a retroreflective structure bonded to at least a portion of the first layer.

In another aspect, the present disclosure comprises a method of forming a retroreflective article comprising: providing a first layer comprising a substantially copolyester ether composition; and, casting and curing a curable resinous composition on at least a portion of the first layer so that the cured resinous composition forms a retroreflective structure.

In another aspect, the present disclosure comprises a method of forming a retroreflective article comprising: providing a film comprising a copolyester ether composition layer; and contacting and curing a curable resinous composition on at least a portion of the film so that the resinous composition forms a retroreflective structure.

This summary is not intended to describe each disclosed embodiment or every implementation of the present disclosure. Many other advantages, features, and relationships will become apparent as the description proceeds. The Figures and the Detailed Description that follow more particularly exemplify illustrative embodiments of the disclosure. The above and other aspects of the disclosure will be apparent from the accompanying drawing and this specification. In no event, however, should the above aspects be construed as limitations on the claimed subject matter, which subject matter is defined solely by the attached claims, as may be amended during prosecution.

DETAILED DESCRIPTION

Figure 1:
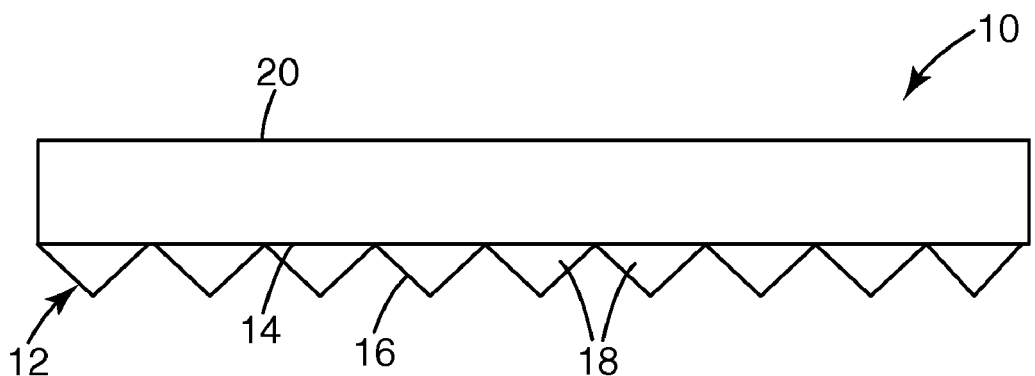
FIG. 1 is a schematic cross-sectional view of a retroreflective article having a structure of discrete cube-corner reflecting elements bonded to a copolyester ether composition top sheet or layer.

The words "a", "an", and "the" are used interchangeably with "at least one" to mean one or more of the elements being described. By using words of orientation, such as "top", "overlying", "front" and "backing" and the like for the location of various elements in the disclosed articles, we refer to the relative position of an element with respect to a horizontally-disposed body portion. We do not intend that the disclosed articles should have any particular orientation in space during or after their manufacture.

The word "light" refers to visible radiation in the electromagnetic spectrum. When used in connection with two or more elements in an optical path, the phrase "optical association" means that a significant portion of light transmitted along the path passes through the elements.

A "retroreflective" article reflects obliquely incident incoming light in a direction parallel to the incident direction, or nearly so, such that an observer or detector at or near the light source can see or detect the reflected light. A "transparent" retroreflective element has a one-way transmission of at least about 5% (and preferably at least about 10%, 20% or 50%) in a band at least 100 nm wide in a wavelength region of interest between about 400 nm and about 700 nm, measured along the normal axis.

Two known types of retroreflective articles are microprismatic or cube-corner-based, and microsphere-based. The word "microprismatic" when used with respect to retroreflective articles refers typically to an array of cube-corner elements. Cube-corner reflecting elements include generally trihedral structures that have three approximately mutually perpendicular lateral faces meeting in a single corner, i.e., a cube-corner to retroreflect incoming light. Cube-corner retroreflective sheeting typically comprises a thin transparent layer having a substantially planar front surface and a rear structured surface comprising a plurality of geometric structures, some or all of which include three reflective faces configured as a cube-corner reflecting element.

The term "microsphere-based" when used with respect to retroreflective articles refers typically to a sheet having a multitude of microspheres or "beads", typically at least partially embedded in a binder layer and having associated specular or diffuse reflecting materials (e.g., pigment particles, metal flakes or vapor coats, etc.) to retroreflect incident light. Due to the symmetrical geometry of beaded retroreflectors, microsphere-based sheeting exhibits the same total light return regardless of orientation, i.e., when rotated about an axis normal to the surface of the sheeting. Thus, such microsphere-based sheeting has a relatively low sensitivity to the orientation at which the sheeting is placed on a surface. In general, however, such sheeting has a lower retroreflective efficiency than cube-corner sheeting.

The word "polymer" includes homopolymers and copolymers, as well as homopolymer or copolymers that may be formed in a miscible blend e.g., by coextrusion or by reaction, including, e.g., transesterification. The term "copolymer includes both random and block polymers. The term "copolyester ether composition" includes compounds of copolyester ether materials, and blends of copolyester ether materials and other polymers.

FIG. 1 illustrates an embodiment of a retroreflective article generally indicated by reference numeral 10 made according the principles of the present disclosure. In this embodiment, the retroreflective article 10 includes a layer or a retroreflective structure 12. The retroreflective structure 12 typically includes a substantially planar viewing surface 14 and a retroreflective surface 16. The substantially planar viewing surface 14 is, in this embodiment, bonded typically to a substantially planar surface of a copolyester ether composition layer 20.

The retroreflective structure 12 includes a plurality of discrete or independent cube-corner reflecting elements 18 that are bonded typically to the copolyester ether composition layer 20 as by curing as will be described hereinafter. The term 'discrete' as used with respect to cube-corner reflecting elements is that each element is detached or independent from an adjacent cube-corner reflecting element. Utilizing discrete cube-corner reflecting elements increases the flexibility of the retroreflective article 10 because each cube-corner reflecting element moves independent from each other. It will be understood that the retroreflective structure 12 can also be provided as a thin and integral retroreflective sheeting of cube-corner reflecting elements which sheeting moves as a single unit.

Cube-corner reflecting elements 18 may be prepared by casting directly onto a film, such as described in U.S. Pat. No. 5,691,846 (Benson) incorporated herein by reference. Typical polymers utilized for radiation cured cube-corner reflecting elements include but are not limited to cross linked acrylates, such as multifunctional acrylates or epoxies and acrylated urethanes blended with mono-and multifunctional monomers. Other typical polymers for cube-corner reflecting elements include but are not limited to poly(carbonate), poly (methylmethacrylate), poly(ethyleneterephthalate), aliphatic polyurethanes, poly(vinyl chloride) as well as ethylene copolymers and ionomers thereof In instances wherein cube-corner sheeting is employed in retroreflective articles, a protective layer may be present for the purpose of resisting chemical and/or ultraviolet degradation. Illustrative examples of cube-corner-based retroreflective sheeting are disclosed in U.S. Pat. No. 5,138,488 (Szczech); U.S. Pat. No. 5,387,458 (Pavelka); U.S. Pat. No. 5,450, 235 (Smith); U.S. Pat. No. 5,605,761 (Burns); U.S. Pat. No. 5,614,286 (Bacon) and U.S. Pat. No. 5,691,846 (Benson, Jr.) all of which are incorporated by reference. In embodiments wherein the sheeting is likely to be exposed to moisture, the cube-corner retroreflective elements are preferably encapsulated with a seal film (not shown). Common forms of attachment of a seal film include but are not limited to RF welding, ultrasonic welding, thermal bonding or sealing, as well as other known suitable methods. In use, the retroreflective structure 12 is arranged with its front viewing surface (i.e., viewing surface 14) being disposed generally toward anticipated locations of intended observers and sources of incident light. Light incident on the front viewing surface 14 enters the sheet and passes through the body of the sheet to be reflected by each of the three faces of the reflecting elements, so as to exit the front surface in a direction substantially toward the source of incident light. In the case of total internal reflection, an air interface (not shown) must remain free of dirt, water, and adhesives and, therefore, is enclosed by a sealing film. The light rays are typically reflected at the lateral faces due to total internal reflection, or by reflective coatings on the back side of the lateral faces.

The copolyester ether composition layer 20 may be made from any suitable light transmissive copolyester-ether elastomers. Typical examples include cyclohexane dimethanol, tetramethylene glycol, and terephthalic acid. It will be appreciated that other suitable copolyester ether compositions are commercially available. A more typical elastomer used to achieve the enhanced retroreflective article is manufactured by Eastman Chemical Company of Kingsport, Tenn. as NEOSTAR® FN006. Basically, the FN006 elastomer material appears to be a copolyester ether mixture based on poly (tetramethyeleneoxide)—also known as poly (1,4 butane diol). The poly(1,4 butane diol) exists as separate molecules or as fairly long runs within a copolymer. Also identified were copolymers of cis and trans 1,4-cyclohexane dimethanol and 1,4 butane diol with trans 1,4 cyclohexane dicarboxlyic acid. Trace amounts of an aromatic compound and/or other compounds may be present.

The Table 1 below tabulates the composition of FN006 NEOSTAR®:

| Species | Integral | Mult | Mole ratio | Mole % | MW | Mass % |
|---|---|---|---|---|---|---|
| poly (1,4 butane diol) | 62.48 | 4 | 15.62 | 37.75% | 90.12 | 26.04% |
| 1,4 cyclohexane dicarboxylic acid | 25.27 | 2 | 12.64 | 30.54% | 172.15 | 40.25% |
| trans1,4 cyclohexane dimethanol | 32.77 | 4 | 8.19 | 19.80% | 144.21 | 21.86% |
| Cis, 1,4cyclohexane dimethanol | 14.53 | 4 | 3.63 | 8.78% | 144.21 | 9.69% |
| 1,4 butane diol | 5.19 | 4 | 1.30 | 3.14% | 90.12 | 2.16% |

The present disclosure contemplates that other similar and suitable versions of copolyester ether compositions may be utilized consistent with practicing the principles of the disclosure. For example, typical variations to its composition include changes being made in a range of about plus or minus 10% of their MW (molecular weight). Other suitable variations are contemplated.

The copolyester ether composition layer 20 contains substantially no plasticizers and is transparent to passing light. As used herein, the term "substantially no plasticizer" means it does not contain amounts that would detract from the advantages derived from not having any plasticizer. Therefore, the copolyester ether composition film is not susceptible to issues created by plasticizer migration, such as is the case with plasticized PVC. Such issues include but are not limited to the loss of flexibility, thermal stability, and premature wearing. Moreover, the copolyester ether composition layer has a softening temperature above 400° F. Therefore, no additional layers need be added thereto for facilitating transportation of a web thereof as during casting and curing of retroreflective articles.

The top or copolyester ether composition layer 20 of the retroreflective article 10 may also include a blended film having a copolyester ether component and at least a selected amount of another polymer component, such as copolyester. The additional polymers may be added to enhance or modify properties of the copolyester ether composition for particular applications. The additional suitable polymer(s) may be added as a resin to the copolyester ether resin and co-extruded into a sheet. In one blended embodiment, a first component of copolyester resin may be added to the copolyester ether resin up to about 25 weight percent of its total weight to enhance the strength of the top layer 20 and without adversely affecting the properties of the copolyester ether composition layer. Alternatively, in two other blended compositions, the copolyester resin may be added to be in a range of about 5 weight percent of total weight to about 95 weight percent of total weight. Conversely in the latter blend, then the ratio of the copolyester ether resin could have a complementary percentage of from about 95 weight percent of total weight to about 5 weight percent of total weight. Other blends and blend ratios are contemplated.

An advantage of the present disclosure is that the copolyester ether composition layer is characterized by exhibiting temperature stability over a wide temperature range of between about −100° F. and about 400° F. The melting point of a copolyester ether composition layer is above 400° F. and the copolyester ether composition film does not become brittle until temperatures are below −100° F. Therefore, the copolyester ether composition layer is useful in a wide range of temperature conditions, especially in outdoor applications without any significant deterioration in performance due to extreme temperatures. Moreover, because of its high softening temperatures, the copolyester ether composition layers can be directly engaged by heating devices, such as heating irons, without degradation. Retroreflective articles with copolyester ether composition layers are versatile, especially relative to such articles that utilized plasticized PVC films. Also, there is substantially no plasticizer migration in the copolyester ether composition layer.

The copolyester ether composition top layer 20 is typically up to about ten (10) mils in thickness. More typically, the copolyester ether composition top layer 20 may be between about 0.2 mil and 8 mil in thickness. Copolyester ether composition films are useful as the copolyester ether composition top layer 20 or as another layer of the retroreflective article 10 because the copolyester ether composition or film top layer 20 is thermally stable, environmental stable, optically clear, stain resistant, easily releases from the tooling or mold, and easily receives a reflective coating such as discrete cube-corner reflecting elements. Because of the inherent physical and thermal properties of the copolyester ether composition film layer 20, additional sheets, such as a top sheet and a backing sheet on the copolyester ether composition film during curing of the cube-corners is unnecessary. Also, this reduces the number of layers or carrier films required to commercially produce retroreflective articles 10, thereby resulting in significant savings.

Figure 7:
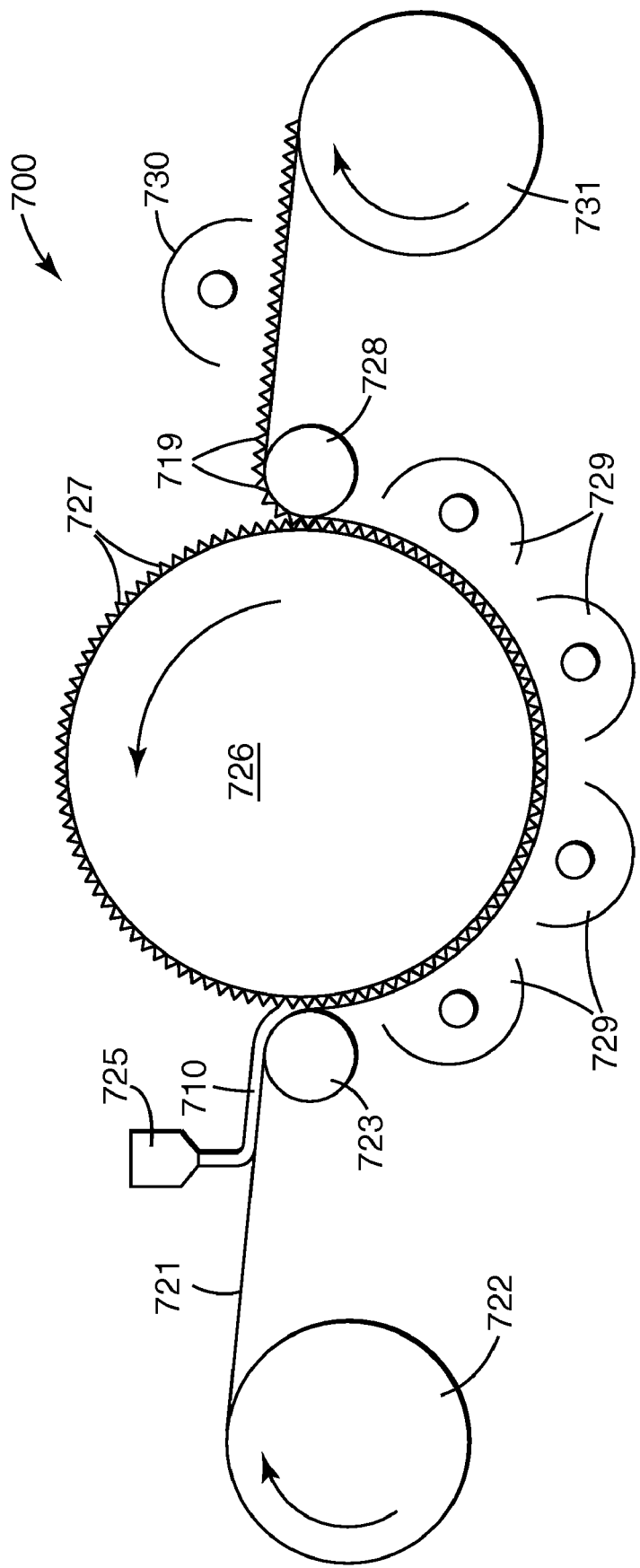
FIG. 7 is a schematic representation of a process for manufacturing a retroreflective article according to the present disclosure.

Reference is made to FIG. 7 for illustrating one typical embodiment of a processing system 700 for making the retroreflective article as illustrated in FIG. 1. In this regard, it will be appreciated that a variety of suitable apparatus and systems exist for making retroreflective articles. For example, reference is made back to U.S. Pat. No. 5,691,846 for describing a process for casting and curing cube-corner reflecting elements on a film for making retroreflective articles. In the processing system 700 as used for making this disclosure, a flowable curable resin composition 710 is used for casting and curing the cube-corner reflecting elements 719 on a copolyester ether composition layer 721. The copolyester ether composition layer 721 is drawn or advanced along a path from an unwind roll 722, such as by a drive mechanism (not shown) for a patterned tool 726. The composition layer 721 may be a flexible, extensible sheet. The curable resin composition 710 coats the composition layer 721 after being applied by a coating die 725 as the composition layer 721 advances. Typical polymers that may comprise the curable resin composition 710 include but are not limited to poly (carbonate), poly (methylmethacrylate), poly (ethylene-terephthalate), aliphatic polyurethanes, poly (vinyl chloride) as well as ethylene copolymers and ionomers thereof. A more typical curable resin composition 710 is a UV curable resin, such as an epoxy acrylate, urethane acrylates, and acrylate monomers with mono, di, and multifunctionality that are commercially available from, for example, Cytec Surface Specialties, located in Smyrna, Ga.

The applied curable resin composition 710 is carried to the patterned tool 726, whereat the resin composition 710 enters a plurality of microcavities 727 on the patterned tool 726 with the aid of nip roll 723 (e.g., rubber coated roller) and the patterned tool 726. The composition layer 721 contacts the resin composition 710 in the microcavities 727. Pairs of UV radiation sources 729, such as UV lamps, are placed in spaced relationship to the advancing composition layer 721 as is illustrated to irradiate the curable composition 710. The curable resin composition 710 is cured or partially cured while in contact with the composition layer 721 to form a bonded array of the cube-corner reflecting elements 719. The composition layer 721 is transparent to the source of actinic UV radiation from the UV radiation sources 729. As used in this regard, the term 'transparent' means that the composition layer 721 must allow an effective proportion of the radiation to pass therethrough. In this embodiment, the radiation sources 729 irradiate the curable resin composition to the desired UV radiation wavelength for effecting curing. A nip roller 728 is responsible for fracturing or delaminating the cured or partially cured cube-corner reflecting elements 719 from the patterned tool 726, whereby they are bonded to and carried with the composition layer 721 as they are being advanced to the winder roll 731 by a drive mechanism (not shown) of the patterned tool 726. The cube-corner reflecting elements 719 can be separated into individual elements. Also, a second UV radiation source 730 similar to the pairs of radiation sources 729 is used for completing the curing. Alternatively, U.S. Pat. No. 5,691,846 describes and teaches processes for forming cube-corner sheeting rather than independent cured reflecting elements. For example, the curable resin composition 710 may be applied directly to the microcavities 727.

The cube-corner reflecting elements may be of the open air-exposed type, the encapsulated kind, or the metallized kind.

Advantages of the processing system 700 are derived from the composition layer 721 having a high softening temperature (e.g., above 400° F.), whereby it need not have additional layers to assist the composition layer through the manufacturing process of retroreflective articles as is typically done with, for example, retroreflective articles having plasticized PVC film. Additionally, no annealing of the composition layer 721 is necessary since its softening temperature has not been reached or exceeded. Accordingly, the processing system 700 is characterized by improved economy and simplification compared to the known manufacturing of retroreflective articles having plasticized PVC films.

Figure 2:
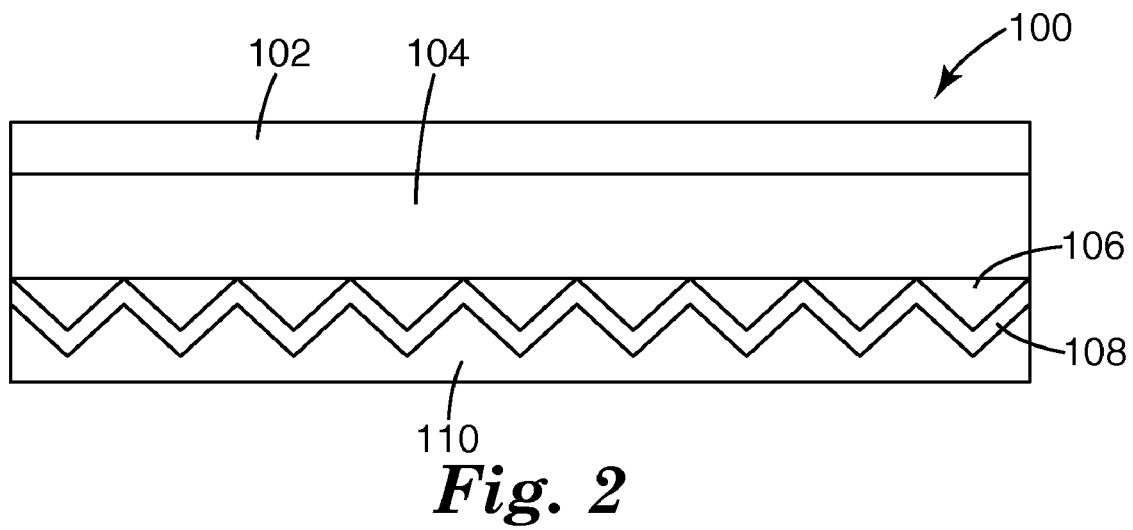
FIG. 2 is a schematic cross-sectional view of another retroreflective article having a copolyester ether composition layer coextruded with another polymer that has a retroreflective structure bonded to the other polymer.

Referring to FIG. 2, there is illustrated another retroreflective structure 100 that includes a copolyester ether composition layer 102 that is coextruded with at least another juxtaposed and at least partially overlying intermediate layer 104. The intermediate polymeric layer 104 is typically made of polymer layer and, more particularly, a polyurethane or copolyester material. A retroreflective structure 106, typically an array of cube-corners, is bonded onto the intermediate polymeric layer 104. The intermediate polymeric layer 104 passes light to permit optical association between the composition layer 102 and the retroreflective structure 106. The intermediate polymeric layer 104 can be bonded to the composition layer 102 as through radiation curing or other typical approaches. The intermediate polymeric layer 104 can be made of any of a variety of suitable materials that are typically used in making a retroreflective article. For example, the intermediate polymeric layer 104 and such other layers may be comprised of additional materials(s) to improve retroreflective optics and/or provide other functions for retroreflective articles. A reflective metallic layer 108 is adhered to the retroreflective structure 106, and an optional temperature or pressure sensitive adhesive layer 110, such as polyurethane, acrylic, rubber, or other hot-melt adhesives, may be adhered to the reflective metallic layer 108. Because of the temperature stability of the copolyester ether composition layer 102, a heat source can be placed onto it to supply sufficient heat in order to soften the adhesive layer 110 onto a suitable substrate (not shown), such as a fabric, without affecting damage or otherwise negatively affecting the retroreflective article that has been applied.

Figure 3:
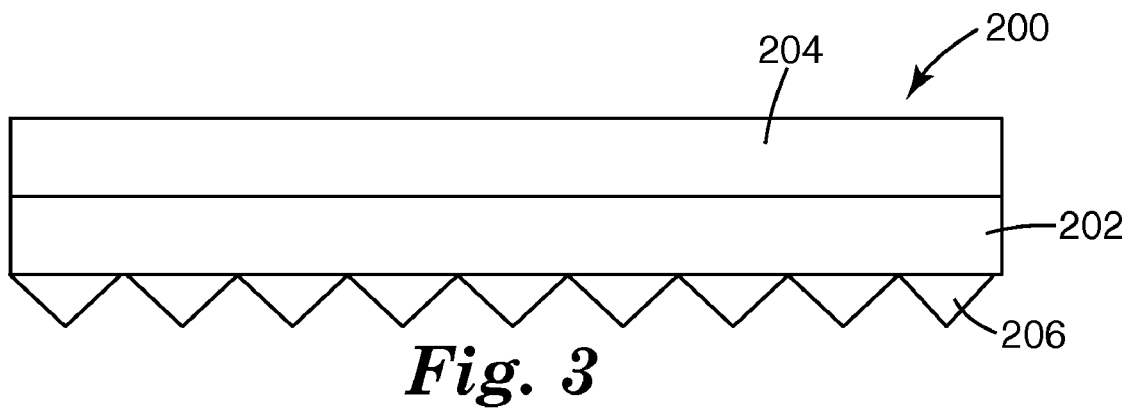
FIG. 3 is a schematic cross-sectional view of another retroreflective article having a polymer layer and copolyester ether layer coextruded together and wherein a retroreflective structure is bonded to the copolyester ether composition layer.

Referring to FIG. 3, another example of a retroreflective article 200 is illustrated. The retroreflective article 200 may include a copolyester ether composition layer 202 that is coextruded with another polymeric layer 204. A retroreflective structure 206 is bonded or cured to the copolyester ether composition layer 202 by applying in a known manner a curable and flowable resin composition, such as an acrylate, to a typical patterned tool. The resin is cured to the copolyester ether composition layer 202 to form an array of cube-corner reflecting elements forming the retroreflective structure. The retroreflective article 200 is useful in situations where the interior of the retroreflective article 200 requires heat resistance while the outer surfaces do not. While retroreflective articles with between two and five layers are illustrated, retroreflective articles having six or more layers are also within the scope of the present disclosure.

The following examples are illustrative and are not meant to be limiting of the present disclosure in any way.

EXAMPLE 1

The intrinsic mechanical properties of a 5 mil copolyester ether composition layer or film and a blended 6 mil film having a composition including a component having about 90 weight percent copolyester ether and a component having about 10 weight percent copolyester were tested. Both of which were manufactured by Eastman Chemical Company of Kingsport, Tenn. wherein the copolyester ether composition is sold under the FN006 NEOSTAR® name. Both were compared to a 7.25 mil plasticized PVC film manufactured by Achilles USA, Inc. of Everett, Wash., and a 4 mil and a 10 mil polyurethane film manufactured by Huntzman LLC of Auburn Hills, Mich. Each of the 'as received' films was cut into rectangular sections of one inch by four inches, except for the 10 mil polyurethane, which was cut into a 0.6 to 0.75 inch width by four inch length.

Each sample was tested using the procedure defined by ASTM D882 for "Standard Test Method of Tensile Properties of Thin Plastic Sheeting" to determine the basic mechanical properties. An Alliance 100 uniaxial tester manufactured by MTS Systems Corporation of Minneapolis, Minn. was utilized in conjunction with Testworks V DAQ tester manufactured by MTS Systems Corporation of Minneapolis, Minn. to determine load displacement acquisition and stress-strain transformation. All tests were carried out in ambient environmental conditions. The following test results are summarized in Table 2 as follows.

TABLE 2

| Sample | Peak Stress (MPa) | Strain at Break (%) | Young's Modulus (MPa) | Energy to Break (Joules) | Strain at Yield (%) |
|---|---|---|---|---|---|
| Huntzman 4 mil PU[1] | 29 ± 8 | 722 ± 101 | 7 ± 2 | 13 ± 4 | 75 ± 11 |
| Huntzman 10 mil PU[1] | 22 ± 5 | 563 ± 103 | 10 ± 2 | 15 ± 5 | 50 ± 15 |
| Achilles 7.25 mil PVC[2] | 26 ± 1 | 343 ± 17 | 52 ± 5 | 15 ± 1 | 27 ± 2 |
| Neostar blend[3] 6 mil | 36 ± 3 | 390 ± 40 | 230 ± 20 | 18 ± 3 | 23 ± 4 |
| Neostar[4] 5 mil | 23 ± 3 | 630 ± 110 | 120 ± 15 | 15 ± 4 | 36 ± 3 |

[1] PU = Polyurethane film
[2] PVC = Plasticized Polyvinylchloride film
[3] Neostar ® blend = 90 weight percent Copolyester ether/10 weight percent copolyester film
[4] Neostar ® = Copolyester ether film The results of these tests indicate that there were no statistically significant differences in the energy to break the five (5) samples tested. Statistical analysis shows that there is no single non-PVC sample that overlaps with all four statistically different properties of the PVC sample. However, the Young's modulus value of the copolyester ether film composition (5 mil) and the copolyester ether/copolyester blend (6 mil) film was higher than that of the PVC and polyurethane samples.

Samples from each of the five films were tested using a TAI Q800 series Dynamic Mechanical Analyzer (DMA) in film tension, from −112° F. to 212° F. at about 4.24° F./minute utilizing oscillatory peak-to-peak strain amplitude of 15 microns and a strain rate (frequency) of 1 Hertz. The DMA results are summarized below in Table 3.

TABLE 3

| | DMA Results | | |
|---|---|---|---|
| Sample | E'[5] @ 24° C. (MPa) | Stiffness @ 24° C. (N/m) | Tg[6] (from Tanσ max) (° C.) |
| Huntzman PU[1] (4 mil) | 24 | 1315 | −15 |
| Huntzman PU[1] (10 Mil) | 22 | 2580 | −17 |
| Achilles PVC[2] (7.25 mil) | 228 | 19,200 | 35 |
| Neostar blend[3] (6 mil) | 496 | 32,500 | 27, 67 |
| Neostar[4] (5 mil) | 230 | 12,800 | 3 |

[1] PU = Polyurethane film
[2] PVC = Plasticized Polyvinylchloride film
[3] Neostar ® blend = 90 weight percent Copolyester ether/10 weight percent copolyester film
[4] Neostar ® = Copolyester ether film
[5] Storage Modulus
[6] Glass transition temperature The results of the these tests indicate that two Neostar® samples have the most comparable mechanical properties to the 7.25 mil plasticized PVC film and have a storage modulus value that exceeds the storage modulus of the plasticized PVC film. The testing indicates that a copolyester ether film and the copolyester ether/copolyester film blend can be suitable replacement for a plasticized poly(vinyl chloride) film.

EXAMPLE 2

A five (5) mil film and an eight (8) mil copolyester ether composition film, both of which are manufactured by Eastman Chemical Company of Kingsport, Tennessee under the NEOSTAR® trademark, were treated with an C2001 acrylate resin manufactured by Cytec Surface Specialties, located in Smyrna, Georgia by cast and cure replication utilizing a 7.0 mil primary spacing nickel tooling. A UV D-lamp manufactured by Fusion UV Systems, Inc. of Gaithersburg, Md. was utilized at a setting of about 60% of the maximum power setting to cure and attach the acrylate resin to the film on the nickel patterned tooling. During the testing the film traveled at a line speed of about 20 feet per minute.

The bonding of the acrylate resin to the copolyester ether composition film was tested by scoring a cube-cornered retroreflective structure and utilizing a tape snap adhesion test utilizing a 898 filament tape manufactured by 3M, Inc. of St. Paul, Minn. The bonding of the acrylate resin to the copolyester ether composition film passed the adhesion test and the retroreflective article was subsequently tested for brightness, wash adhesion and temperature performance.

Figure 4:
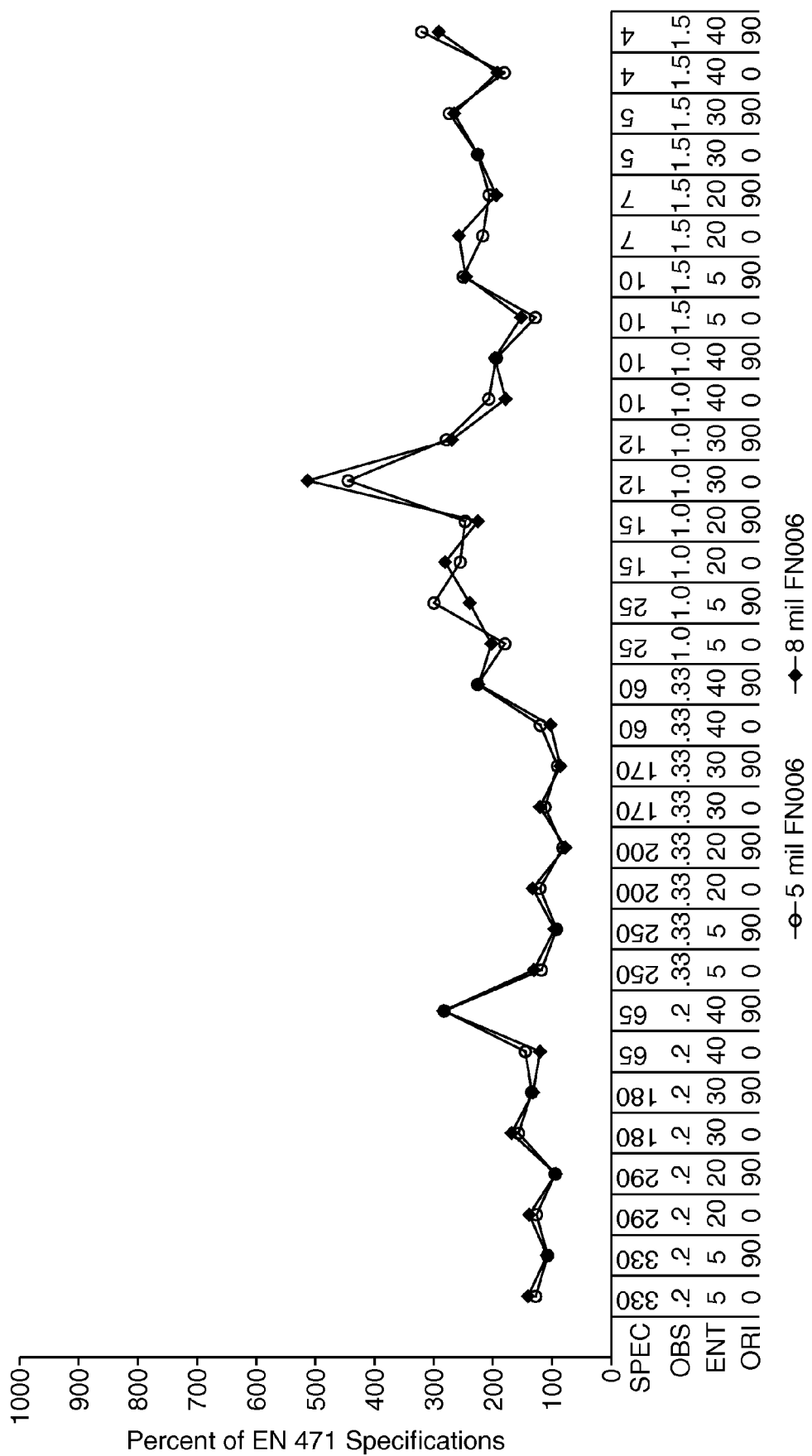
FIG. 4 is a graph of the brightness of a retroreflective article having a 5 mil and an 8 mil copolyester ether composition top sheet or layer as compared to a brightness standard set forth in the European Standard EN471 for high-visibility warning clothing for professional use.

The brightness was tested by utilizing the EN471—European Standard for "High-visibility warning clothing for professional use-Test methods and Requirements." The results of the testing are provided in FIG. 4 which indicates that the brightness of the copolyester ether/acrylate retroreflective composition equaled or exceeded the standard required by the European Standard EN471 for high-visibility warning clothing for professional use.

Figure 5:
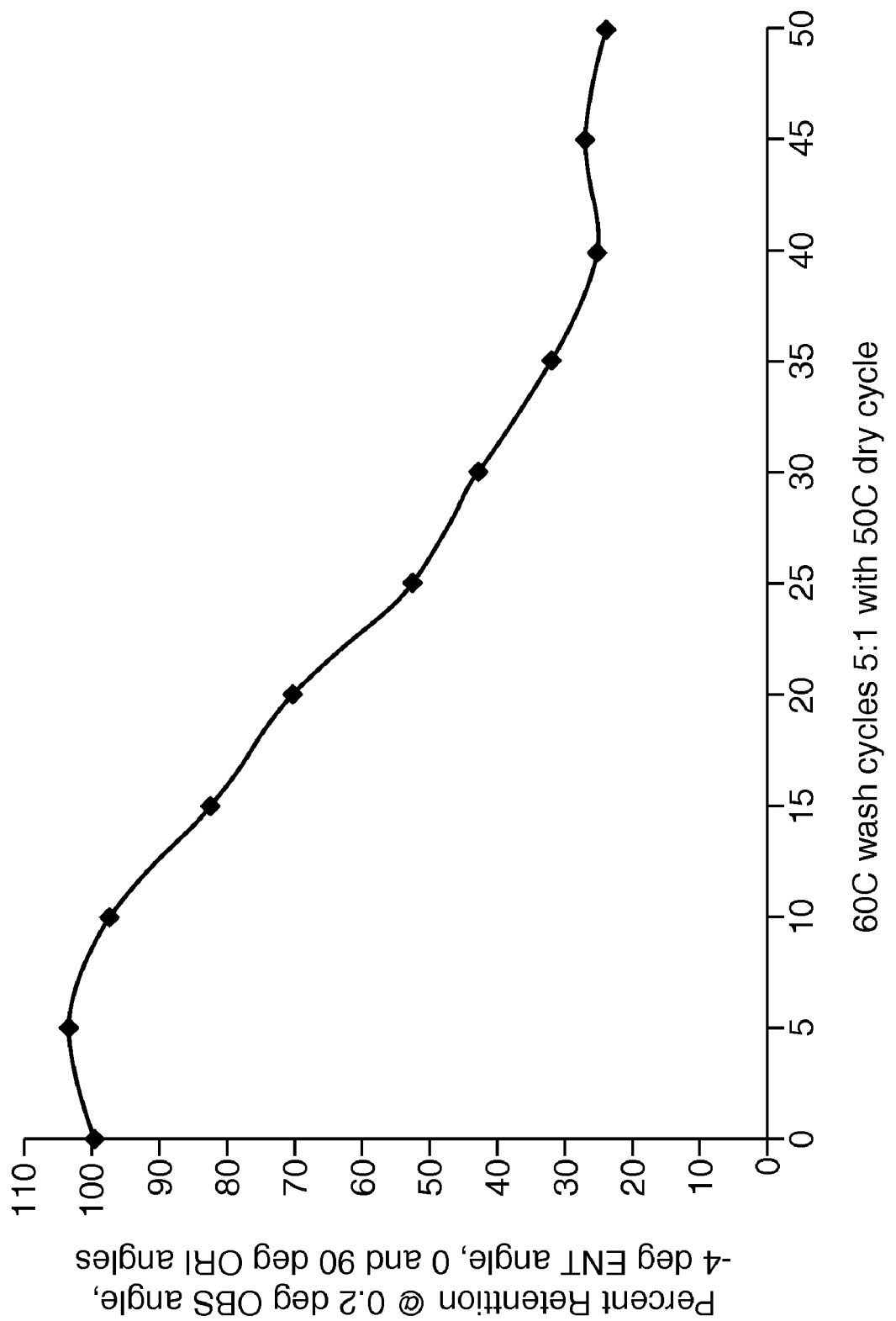
FIG. 5 is a graph of the brightness of a retroreflective article having a 6 mil copolyester ether film composition utilized as a top layer on a retroreflective article during fifty wash and ten dry cycles.

The durability of the copolyester ether/acrylate retroreflective article was tested by repeatedly washing the copolyester ether/acrylate retroreflective article at about 60° C. and drying the retroreflective structure at about 50° C. The results as illustrated in FIG. 5 indicate that after 50 washing cycles and ten drying cycles (one drying cycle for every five consecutive washing cycles), the copolyester ether/acrylate retroreflective composition, while experiencing some degradation, still retained about 25% of the initial brightness of the article. After fifty washing and drying cycles, there was no loss of cube-corner reflective elements from the copolyester ether composition film. Both tests indicate that the copolyester ether composition film is an adequate sheet for a retroreflective article that is useful for clothing or other applications that require repeated wash and wear exposure. While not being bound to theory, it is believed that the brightness reduced with washing because of contact between the discrete cube-corner reflecting elements. A visual inspection showed that the discrete cube-corners were intact and adhered to the copolyester ether composition film.

Figure 6:
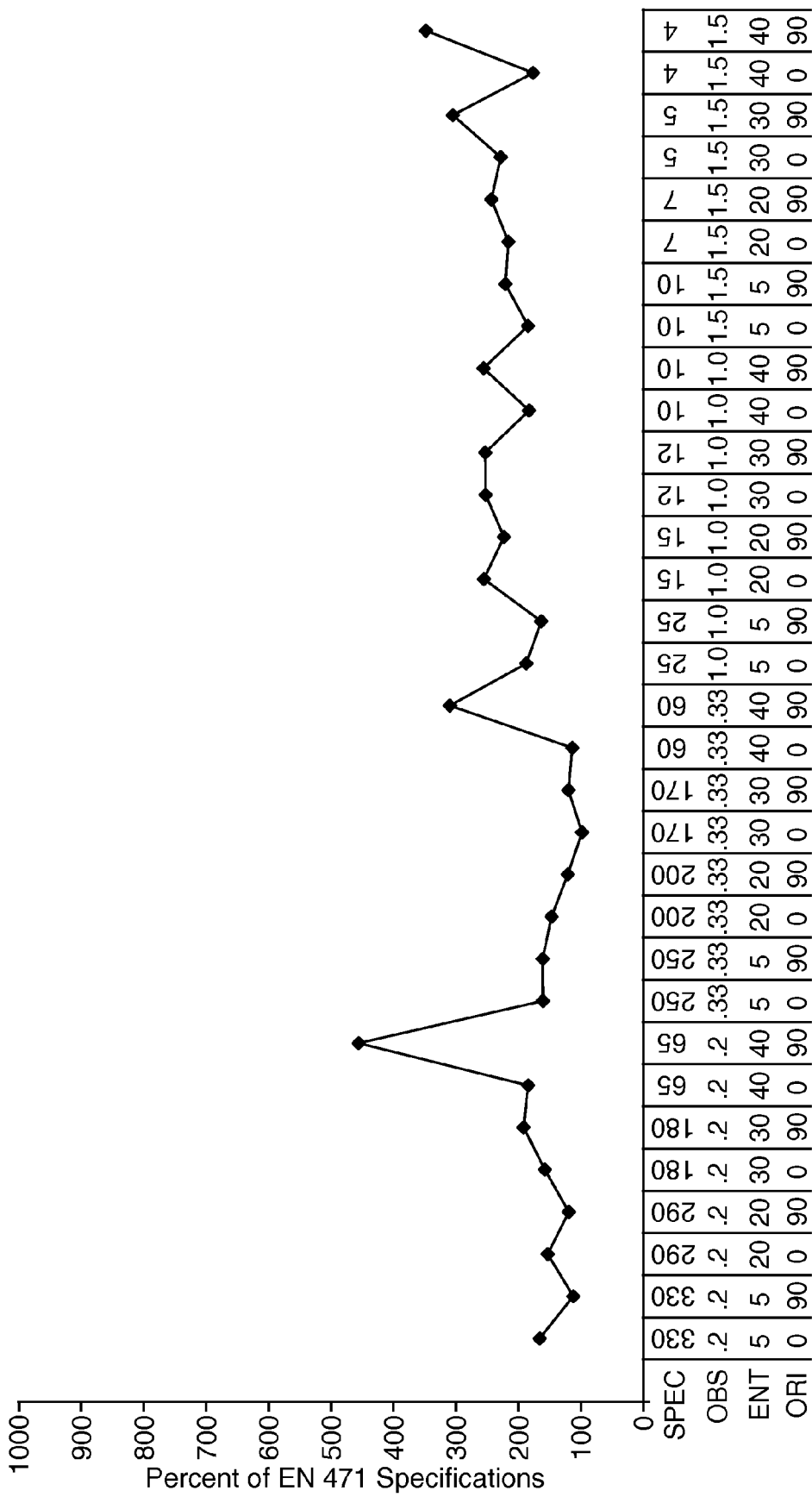
FIG. 6 is a graph of the brightness of a retroreflective article having an 8 mil copolyester ether composition utilizing a top layer on a retroreflective article that has been embossed at 425° F. as compared to the brightness standard set forth in the European Standard EN471.

The high temperature stability properties of the 8 mil copolyester ether/acrylate retroreflective article was tested in comparison to a plasticized PVC utilizing a N-80 hot press manufactured by Hix Corporation of Pittsburg, Kans. The hot press was utilized to thermally emboss a sparkle pattern into each film at about 425° F. at about 20 psig for about 50 seconds. The PVC film melted and bonded to the embossing surface and therefore was not tested for brightness. The copolyester ether/acrylate retroreflective article was embossed at the elevated temperatures and had brightness readings as illustrated in FIG. 6, which were similar brightness readings in FIG. 4 of the unembossed copolyester ether/acrylate retroreflective structure. Another advantage of such a retroreflective structure is characterized by its ability to withstand higher temperatures than plasticized PVC versions of retroreflective structure without losing its stability.

Figure 8:
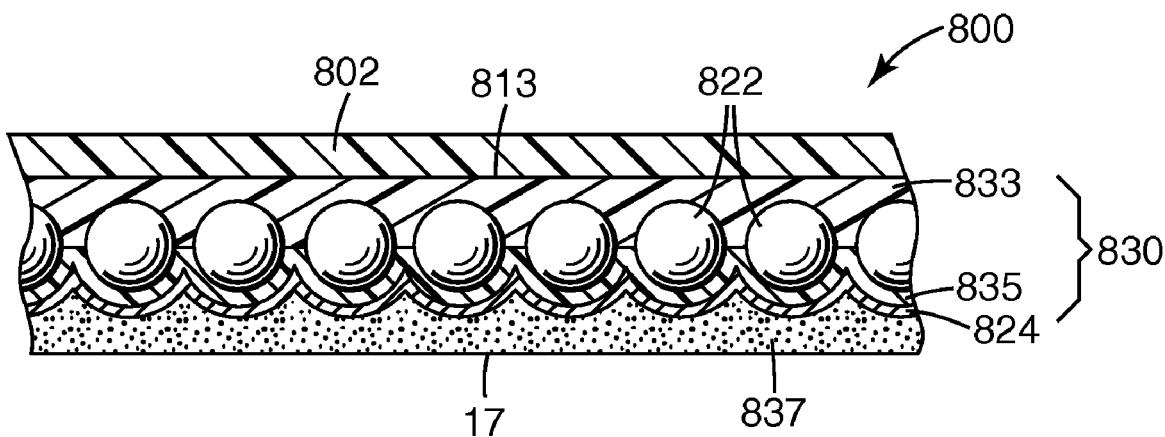
FIG. 8 is a schematic cross-sectional view of a retroreflective article having a microsphere-based structure bonded to a copolyester ether composition layer.

FIG. 8 illustrates one embodiment of a retroreflective article or film 800 comprising a copolyester ether composition layer 802 bonded to a surface of a microsphere-based retroreflective structure 830. The copolyester ether composition layer 802 is like that described above in the previous embodiments and may be bonded or attached in any suitable manner. The copolyester ether composition layer 802 may be added to the retroreflective structure 830 after formation of the latter in a process similar to that described above in regard to FIG. 7. One typical kind of microsphere-based retroreflective structure 830 that may be utilized is disclosed in U.S. Pat. No. 6,677,028 (Lasch). In particular, the retroreflective structure 830 includes a suitable face member 833 having a viewing surface 813, a plurality of transparent beads 822, and a suitable reflective layer 824 held in a cooperative position with respect to the beads by a binder layer 835. An adhesive layer 837 is joined to the reflective layer 824. The transparent beads 822 have a first hemispherical portion enclosed by the face member 833, and a second opposing hemispherical portion in the binder layer 835 that is spaced from the reflective layer 824. Alternative typical microsphere-based structures are contemplated for use by the present disclosure. These alternatives include but are not limited to those described in U.S. Pat. No. 4,025,159 (McGrath); U.S. Pat. No. 4,983,436 (Bailey); U.S. Pat. No. 5,064,272 (Bailey); U.S. Pat. No. 5,066,098 (Kult); U.S. Pat. No. 5,069,964 (Tolliver); U.S. Pat. No. 5,262,225 (Wilson); and U.S. Pat. No. 5,812,317 (Billingsley et al.).

Figure 9:
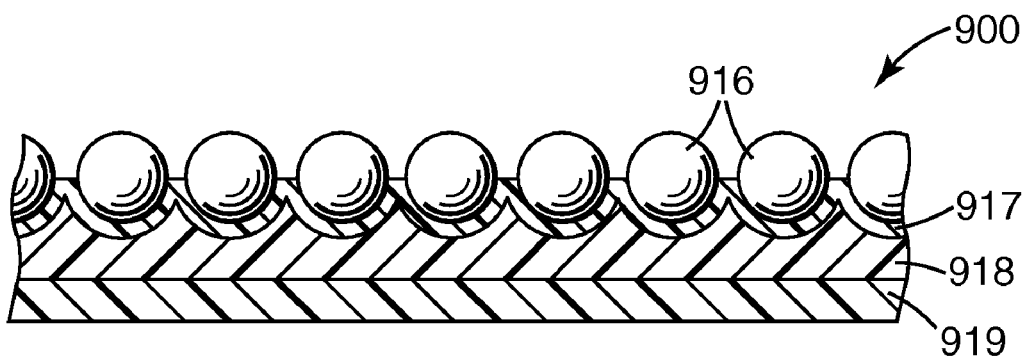
FIG. 9 is a schematic cross-sectional view of another embodiment of a retroreflective article having a microsphere-based structure.

FIG. 9 illustrates an embodiment of an exposed lens type of microsphere retroreflective article 900 embodying the present disclosure. The retroreflective article 900 includes optical elements in the form of at least a layer of microspheres 916 and a specular reflective layer 917. The layer of microspheres 916 used in this beaded construction is substantially spherical in shape to provide uniform retroreflection. While the specular reflective layer 917 is illustrated as being in contact with the microspheres, such need not be the case since as is known intermediate layers (not shown) may be used. In this embodiment, the layer of microspheres 916 and the specular reflective layer 917 may be suitably coextruded with a juxtaposed copolyester ether composition layer 918 to form the retroreflective article 900, wherein the layer of microspheres 916 becomes embedded in the copolyester ether composition layer 918. While the copolyester ether composition layer 918 is coextruded to the layer of microspheres 916 and the specular reflective layer 917, the present disclosure contemplates that the copolyester ether composition layer 918 can be coated by other suitable coating approaches. One typical approach for making the retroreflective article 900 is described in U.S. Pat. No. 4,377,998 (Tung et al.). However, one major difference is that the copolyester ether composition layer 918 replaces the binder layer material described in the patent. In this regard, the copolyester ether composition layer 918 has a high melting temperature as previously mentioned so it is heated to an extent to soften it, whereby the microspheres 916 will be partially embedded into it during the formation of the retroreflective article 900. Accordingly, there is provided an enclosed lens type of microsphere retroreflective article 900.

Figure 10:
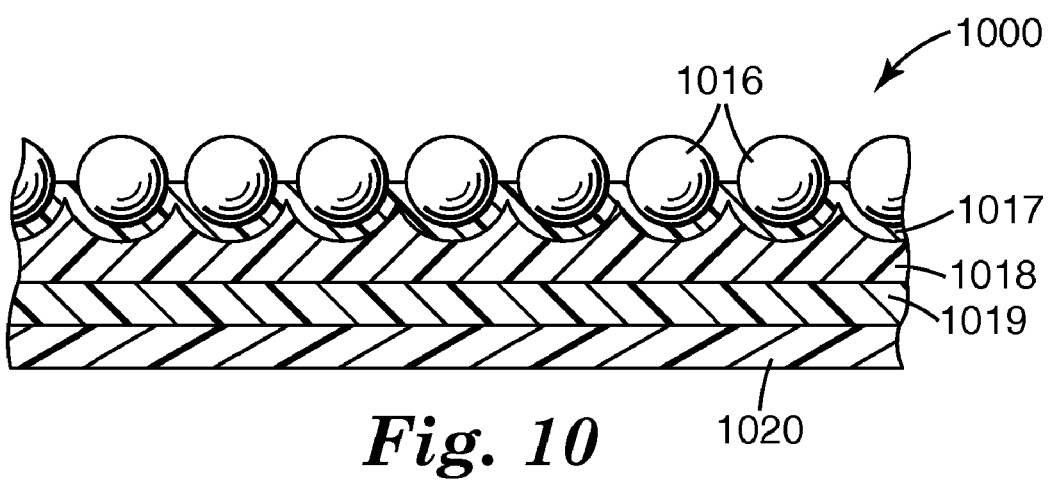
FIG. 10 is a schematic cross-sectional view of another embodiment of a retroreflective article having a microsphere-based structure.

FIG. 10 illustrates another embodiment of an exposed lens type of retroreflective article 1000. The retroreflective article 1000 is similar to that described in U.S. Pat. No. 5,055,347 (Bacon), which description is incorporated herein and made a part hereof. More particularly, the retroreflective article 1000 comprises at least a layer of microspheres 1016, a specular reflective layer 1017, a binder layer 1018, and a copolyester ether composition layer 1019. Typical microspheres 1016 and specular reflective layers 1017 are described above. A more typical type of the layers 1016, 1017 and 1018 is described in U.S. Pat. No. 5,055,347 which description is incorporated herein and made a part hereof. In this embodiment, the binder layer 1018 may comprise a vulcanizable or curable elastomer, whereby the layer of microspheres 1016 become embedded in it. The binder layer 1018 has a high melting temperature (e.g., high enough to be used in fire resistant clothing). In one typical embodiment following formation the foregoing formation, the copolyester ether composition layer 1019 is coextruded to the binder layer 1018 in a known manner. Other coating processes are also contemplated for use in making a multi-layer construction. As such, the retroreflective article 1000 can be affixed, as by sewing, to fire resistant clothing. Alternatively, this embodiment of the retroreflective article 1000 also envisions including an adhesive layer 1020 bonded to an exterior facing surface of the copolyester ether composition layer 1019. The adhesive layer 1020 may comprise any suitable hot-melt adhesive that is intended to be heated and applied to a suitable substrate (not shown) for affixing the retroreflective article 1000 to the substrate. It should be noted that the hot-melt adhesive should be selected such that its softening temperature does not result in the layer of microspheres 1016 sinking into the copolyester ether composition layer 1018. The thicknesses of the various layers can vary so long as they provide the desired properties of the retroreflective article 1000.

All references including the patents cited herein are expressly incorporated herein by reference in their entirety into this disclosure. Illustrative embodiments of this disclosure are discussed and reference has been made to possible variations within the scope of this disclosure. These and other variations and modifications in the disclosure will become apparent to those skilled in the art without departing from the scope of the disclosure, and it should be understood that this disclosure is not limited to the illustrative embodiments set forth herein. Accordingly, the disclosure is not to be limited only by the claims provided below.

What is claimed is:

1. A retroreflective article comprising a first layer comprised of a copolyester ether composition, and a second layer comprised of a retroreflective structure juxtaposed in at least a partially overlying relationship to the first layer, wherein the retroreflective structure includes a microprismatic structure, and wherein the first layer is coupled to a viewing surface of the second layer, and wherein the first layer has temperature stability in a temperature range of between about −100° F. and 400° F.

2. The retroreflective article of claim 1, wherein the first layer has substantially no plasticizer therein.

3. The retroreflective article of claim 1 having a brightness that is equal to or exceeds a brightness standard set by European Standard EN 471 for High-visibility warning clothing for professional use.

4. The retroreflective article of claim 1, wherein the first layer comprises at least a copolyester ether compound.

5. The retroreflective article of claim 1, wherein the first layer comprises a blend including a first component comprising a copolyester ether compound, and at least a second component comprising a polymer material.

6. The retroreflective article of claim 1, wherein the first layer comprises a thickness of up to about 10 mils.

7. The retroreflective article of claim 6, wherein the first layer comprises a thickness of between about 0.2 mils and about 10 mils.

8. The retroreflective article of claim 1, further comprising at least a third layer comprised of a polymer material that is bonded to at least one of the first and second layers and is intermediate to the juxtaposed first and second layers.

9. The retroreflective article of claim 1, further comprising at least a third layer comprised of a polymer material that is bonded to a viewing surface of the first layer that is opposing the second layer.

10. The retroreflective article of claim 1, wherein the copolyester ether composition comprises a blend comprising about 90 weight percent of copolyester ether and about 10 weight percent of copolyester composition.

11. The retroreflective article of claim 1, wherein the microprismatic structure is an array of cube-corner reflecting elements.

12. The retroreflective article of claim 1, wherein the copolyester ether composition comprises a blend ratio comprising between about 95 to about 5 weight percent of copolyester ether and about 5 to about 95 weight percent of copolyester composition.

13. A retroreflective article comprising a first layer comprised of a copolyester ether composition, and a second layer comprised of a retroreflective structure juxtaposed in at least a partially overlying relationship to the first layer, wherein the retroreflective structure includes a microprismatic structure, and wherein the first layer is coupled to a viewing surface of the second layer, and wherein the retroreflective article has a brightness that is equal to or exceeds a brightness standard set by European Standara EN 471 for High-visibility warning clothing for professional use.

14. The retroreflective article of claim 13, wherein the first layer has substantially no plasticizer therein.

15. The retroreflective article of claim 13, wherein the first layer comprises at least a copolyester ether compound.

16. The retroreflective article of claim 13, wherein the first layer comprises a blend including a first component comprising a copolyester ether compound, and at least a second component comprising a polymer material.

17. The retroreflective article of claim 13, wherein the first layer comprises a thickness of up to about 10 mils.

18. The retroreflective article of claim 13, wherein the first layer comprises a thickness of between about 0.2 mils and about 10 mils.

19. The retroreflective article of claim 13, further comprising at least a third layer comprised of a polymer material that is bonded to at least one of the first and second layers and is intermediate to the juxtaposed first and second layers.

20. The retroreflective article of claim 13, further comprising at least a third layer comprised of a polymer material that is bonded to a viewing surface of the first layer that is opposing the second layer.

21. The retroreflective article of claim 13, wherein the copolyester ether composition comprises a blend comprising about 90 weight percent of copolyester ether and about 10 weight percent of copolyester composition.

22. The retroreflective article of claim 13, wherein the microprismatic structure is an array of cube-corner reflecting elements.

23. The retroreflective article of claim 13, wherein the copolyester ether composition comprises a blend ratio comprising between about 95 to about 5 weight percent of copolyester ether and about 5 to about 95 weight percent of copolyester composition.

24. A retroreflective article comprising a first layer comprised of a copolyester ether composition, and a second layer comprised of a retroreflective structure juxtaposed in at least a partially overlying relationship to the first layer, wherein the retroreflective structure includes a microprismatic structure, and wherein the first layer is coupled to a viewing surface of the second layer, and wherein the copolyester ether composition comprises a blend ratio comprising between about 95 to about 5 weight percent of copolyester ether and about 5 to about 95 weight percent of copolyester composition.

25. The retroreflective article of claim 24, wherein the first layer has substantially no plasticizer therein.

26. The retroreflective article of claim 24, wherein the first layer comprises a thickness of up to about 10 mils.

27. The retroreflective article of claim 24, further comprising at least a third layer comprised of a polymer material that is bonded to at least one of the first and second layers and is intermediate to the juxtaposed first and second layers.

28. The retroreflective article of claim 24, further comprising at least a third layer comprised of a polymer material that is bonded to a viewing surface of the first layer that is opposing the second layer.

29. The retroreflective article of claim 24, wherein the copolyester ether composition comprises a blend comprising about 90 weight percent of copolyester ether and about 10 weight percent of copolyester composition.

* * * * *

UNITED STATES PATENT AND TRADEMARK OFFICE
CERTIFICATE OF CORRECTION

PATENT NO. : 7,842,374 B2  
APPLICATION NO. : 11/460749  
DATED : November 30, 2010  
INVENTOR(S) : Chet A. Bacon Page 1 of 1

It is certified that error appears in the above-identified patent and that said Letters Patent is hereby corrected as shown below:

Drawings Sheet 3 of 6  
Fig. 5, Delete "Retenttion" and insert -- Retention --, therefor.

Column 2  
Line 41, Delete "DRAWING" and insert -- DRAWINGS --, therefor.

Column 4  
Line 45, Delete "thereof" and insert -- thereof. --, therefor.

Column 5  
Line 37, Delete "1,4cyclohexane" and insert -- 1,4 cyclohexane --, therefor.

Column 6  
Line 9, Delete "5weight" and insert -- 5 weight --, therefor.

Column 13  
Line 29, In Claim 13, delete "Standara" and insert -- Standard --, therefor.

Signed and Sealed this  
Twenty-second Day of February, 2011

David J. Kappos  
*Director of the United States Patent and Trademark Office*